United States Patent [19]
Fuehrer et al.

[11] 3,953,970
[45] May 4, 1976

[54] TORQUE CONVERTER TRANSMISSION

[75] Inventors: Reece R. Fuehrer, Danville; James F. Hartz, Indianapolis, both of Ind.

[73] Assignee: General Motors Corporation, Detroit, Mich.

[22] Filed: Feb. 21, 1975

[21] Appl. No.: 551,833

[52] U.S. Cl................................. 60/337; 60/361; 60/364; 180/70 R
[51] Int. Cl.² .......................................... F16D 33/00
[58] Field of Search ............ 60/337, 347, 358, 361, 60/362, 364, 367; 180/70 R

[56] References Cited
UNITED STATES PATENTS

| | | | |
|---|---|---|---|
| 2,645,299 | 7/1953 | Vincent............................ | 180/70 R |
| 2,699,074 | 1/1955 | Livezey et al...................... | 74/645 |
| 2,734,399 | 2/1956 | Christenson ...................... | 74/732 |
| 3,039,326 | 6/1962 | Christenson ...................... | 74/688 |
| 3,566,999 | 3/1971 | Robinson ......................... | 60/337 X |
| 3,591,966 | 7/1971 | Kell................................. | 60/337 |

*Primary Examiner*—Edgar W. Geoghegan
*Attorney, Agent, or Firm*—A. M. Heiter

[57] ABSTRACT

An angle drive transmission having an angle drive input shaft and driving bevel gear driving a driven bevel gear on an input sleeve shaft supported on each side of the driven bevel gear by bearings in an end wall and a central wall of the main housing. The sleeve shaft drives a pump mounted on the end wall and extends through the end wall to drive and support the clutch wall of an outboard mounted rotary torque converter housing. An outboard cover housing has its open end secured to the main housing at the end wall, encloses the rotary housing and has a central ground member rotatably supporting the impeller wall of the rotary housing. The torque converter has a bladed impeller on the impeller wall, a bladed turbine adjacent the clutch wall connected to an output shaft rotatably mounted in the sleeve shaft and a bladed stator between the impeller and turbine mounted on the ground member. A lockup clutch between the clutch wall and turbine in lockup connects the rotary housing to drive the output shaft. The pump and a regulator valve in the end wall supply fluid by an internal central supply passage provided transfer passages through the sleeve shaft, through a passage in the output shaft to enter between the turbine and stator to the converter flow path and exit by an internal central exit passage between the impeller and stator through the cover housing and external passage to a cooler. The torque converter hydrokinetic thrust and the bevel gear thrust are axially opposed and substantially equal to balance thrust load on the sleeve shaft.

19 Claims, 4 Drawing Figures

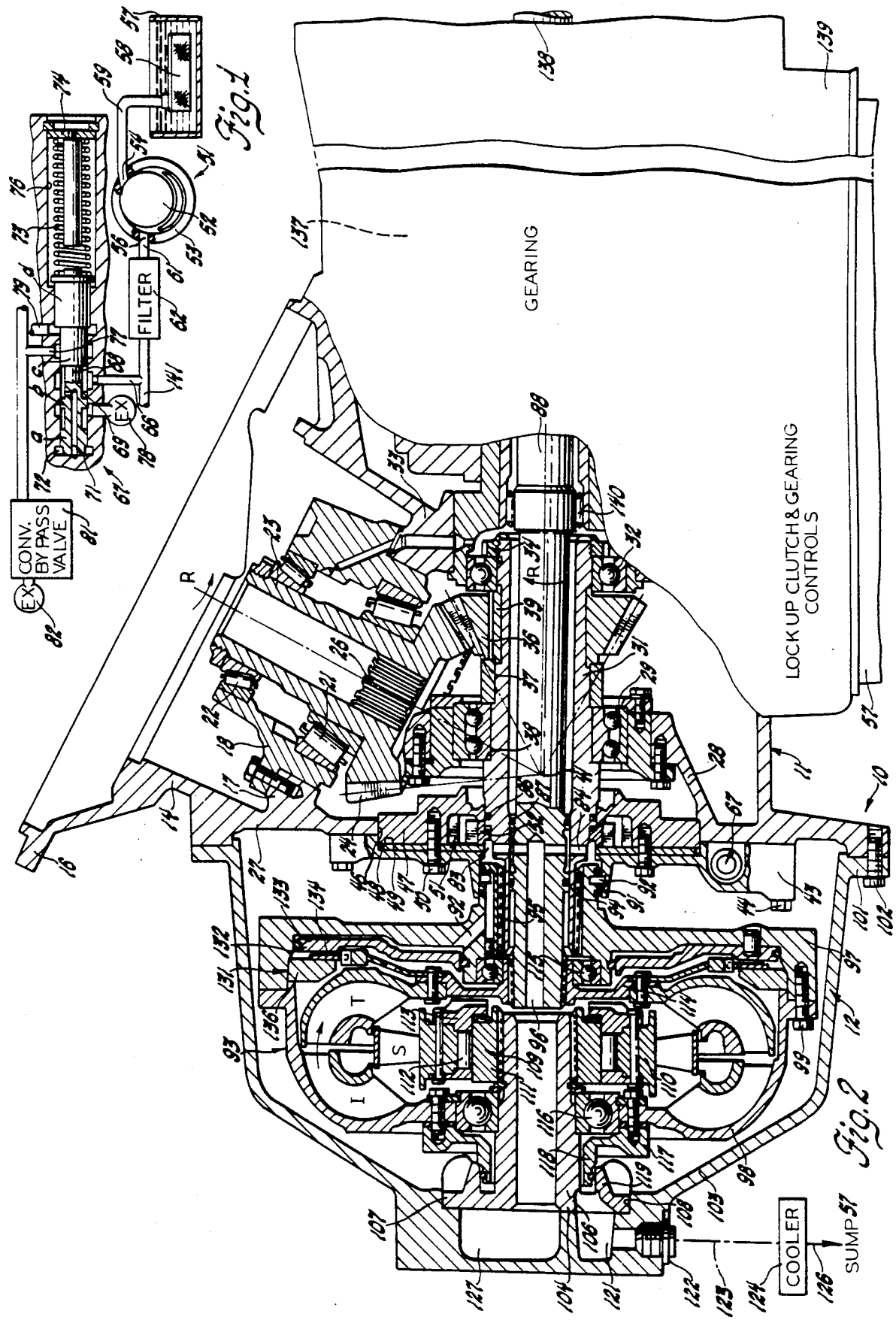

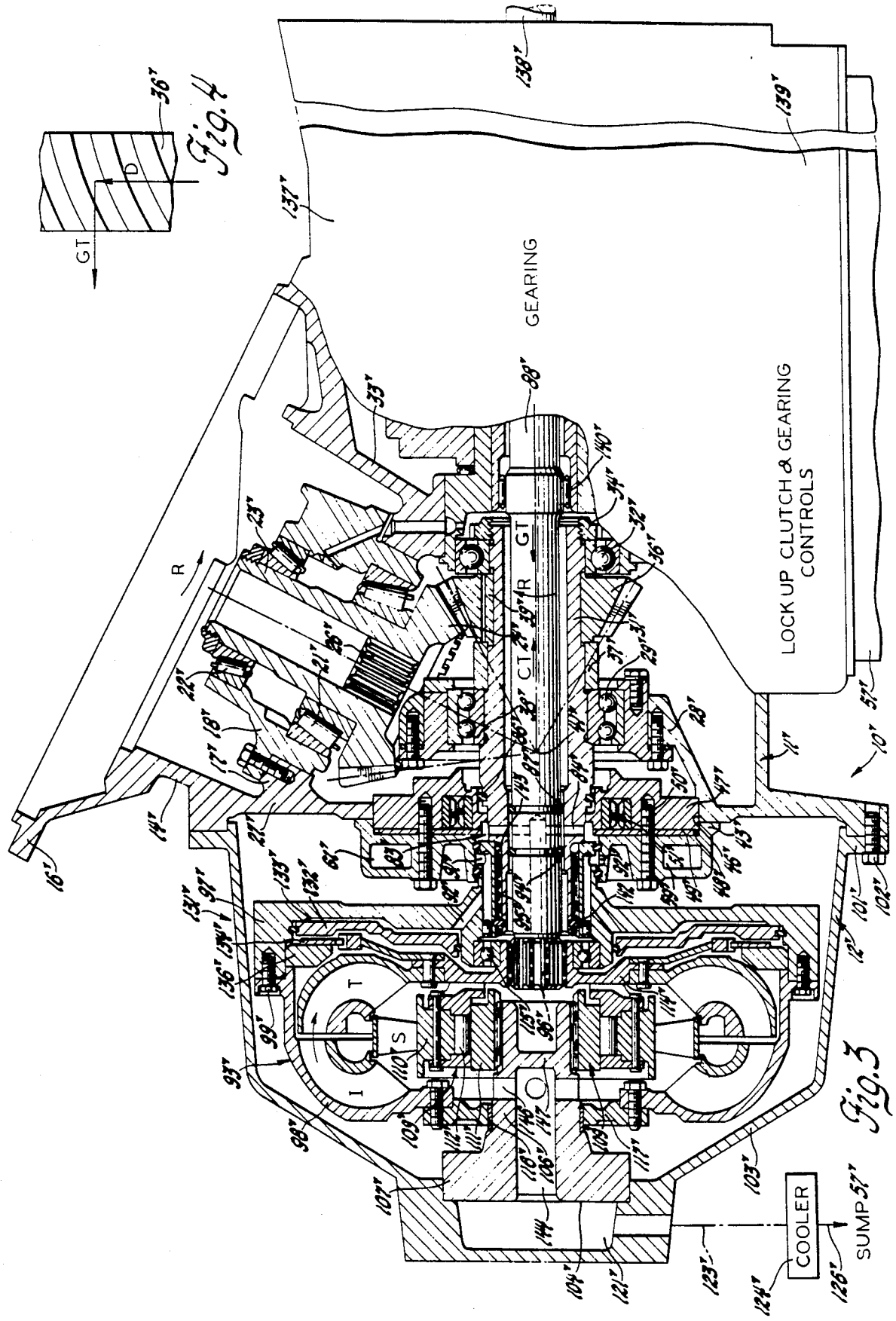

3,953,970

TORQUE CONVERTER TRANSMISSION

SUMMARY OF INVENTION:

This invention relates to torque converter transmissions and particularly to a transmission drive and torque converter arrangement and fluid supply.

The transmission has an improved arrangement of an input angle drive located between an outboard torque converter and output gearing with the input shaft to the same side input output torque converter and the converter turbine shaft extending through a supporting end wall of the main transmission case. The input shaft drives a fluid pressure supply pump mounted on the end wall. The pump supplies fluid at a pressure regulated by a regulator valve through an internal central supply passage fluid transfer bushings and passages in the shafts to enter between the converter turbine and stator into the converter toric flow path and exit an internal central exit passage between the converter impeller and stator in a path formed with a ground member mounted inside a cover housing enclosing the torque converter and fixed to the main transmission housing.

The transmission has drive gearing and a torque converter which provide substantially the same axial thrust in opposite directions and are connected to the same shaft to reduce the thrust load on the bearings supporting the shaft.

The input sleeve shaft is supported on, and extends through, a transverse support wall of a main housing and drives a pump mounted on the wall. The outboard mounted rotary torque converter housing has one side driven by the sleeve shaft and the impeller side rotatably supported on a ground member fixed to the spaced wall of a cover housing secured to the main housing at the support wall. A turbine near the one wall of the converter housing drives an output shaft rotably mounted in the sleeve shaft. A stator between the impeller and turbine is mounted on the ground member. The pump delivers fluid from the main housing sump to a regulator valve in the support wall and through transfer bushings and passages through the sleeve shaft and output shaft to the space between the output shaft and ground member. The fluid passes between the turbine and stator into the converter toric flow path and exits between the stator and impeller and front cover to a cooler to provide completely internal supply and exit passages.

These and other features of the invention will be more apparent from the following description and drawings.

FIG. 1 is a hydraulic schematic of the transmission and torque converter fluid supply.

FIG. 2 is a partial sectional view of the transmission.

FIG. 3 is a partial sectional view of a modified transmission.

FIG. 4 is a partial view of the driven bevel gear showing the driving and thrust forces.

Referring to FIG. 2, the transmission housing 10 has a main barrel housing 11 and a cover housing 12. The main housing 11 has an angle input drive annular housing 14 extending transversely relative to main housing 10. The angle input drive housing 14 has an engine attachment flange 16 and an annular boss 17 supporting the annular bearing support 18 for thrust and rotary bearings 21 and 22 which support the input sleeve hub 23 of input bevel gear 24. The input or engine shaft (not shown) is positioned in input sleeve hub 23 and spline connected to splines 26 on the hub to drive bevel gear 24 in the direction of the input drive arrow. The main housing 11 has a front end support wall 27 having a bearing support portion 28 with a central opening supporting radial and thrust bearing 29 for centrally supporting the input sleeve shaft 31. The sleeve shaft at the rear end is supported by bearing 32 mounted in a central opening in central support wall 33.

A threaded lock nut 34 on the rear end of sleeve shaft 31 engages the inner race of bearing 32, which sequentially engages bevel gear 36, spacer ring 37 and the inner race of bearing 29 against shoulder 38 on the sleeve shaft to axially locate these parts on the sleeve shaft. Input bevel gear 24 drives bevel gear 36 which is connected by key 39 to drive sleeve shaft 31. The bevel gear set has its apex 41, or intersection of the bevel gear axes, pitch lines and input hub and sleeve shaft axes and has left hand spiral bevel gear teeth to provide, when driven in the direction of the arrow, bevel gear axial thrust in a direction from the driven gear 36 toward apex 41.

The front end wall 27 has a annular support member 43 secured by screws 44 to the wall in overlapping relation to an opening 46 in the wall for a pump housing 47. The support member has a recess 48 to receive and locate a passage plate 49 and pump housing 47 in sandwich relation to provide fluid passages between support member 43 and pump housing 47 as explained below. Screws 50 secure passage plate 49 and pump housing 47 to support member 43. The pump 51 is a conventional concentric gear pump with the internal gear 52 having a tang and groove or spline drive connection to shaft 31 and the external gear 53 fixed to the pump housing and having (FIG. 1) inlet port 54 and outlet port 56. The control and lubrication system drains back to the sump 57 of main housing 11 and is pumped through intake screen 58 and suction line 59 to inlet port 54 and delivered by the pump to outlet port 56 a main line portion 61 to a filter 62. The main line portion extends to the exterior surface of the main housing for connection to an external filter mounted on the transmission housing or vehicle. The main line portion 66 from the filter returns filtered fluid to the regulator valve 67 having a valve element 68 having equal small diameter lands a, b and c and a larger land d in stepped bore 69. Main line 66 is connected at all times between lands 68b and c and restricted passage 71 through the valve element to the chamber at the closed end of the bore. A spring 73 seated on the spring seat and guide and valve stop assembly 74 is located in spring chamber 76 which is vented through the spring seat and engages the valve element. The main line pressure is regulated by main line pressure in chamber 72 acting on land 68a and moving valve element 68 against the bias of spring 73 to connect first overage to converter supply line 77 and second overage to exhaust 78. A conventional forward line 79 is connected to the step between lands 68c and d to reduce the regulated main line pressure in forward drive. The converter supply line 77 has one branch connected to converter bypass valve 81, and another branch connected to the converter. The pressure in the converter supply line 77 is limited at a value less than main line pressure by the converter bypass or relief valve 81 and the excess fluid is returned by exhaust 82 to the sump. The bypass valve may be located in the support member 43 adjacent regulator valve 67 or in the sump 57 as only one passage is required to extend to the bypass valve. The sump 58 is at the lower portion of main housing 11 and has the intake screen 58 submerged in oil. The suction line 59 is in part a pipe to the end wall 27 and a channel in passage plate 49 to pump inlet 54. The pump outlet is connected through another channel line 61 in passage plate 49 to a conventional filter boss (not shown) on the exterior of the main housing and returned by line 65 in the passage plate to the regulator valve 67. The converter feed line 77 is connected by the passage plate to the converter bypass valve 81 and to transfer passage 83 which consists of radial passages 84 through sleeve shaft 31 with seals preventing axial flow among the internal and external surface of the sleeve shaft. At the rear of passage 84 seal 86 on sleeve shaft 31 engages the inner opening of pump housing 47 of wall 27 and seal 87 on turbine output shaft 88 engages the inner surface of sleeve shaft 31. At the forward side of passage 84 a transfer passage 91 has seals on both sides of lockup clutch apply passage 92 to transfer passage 92 from support member 43 to rotary converter housing 93 to provide a seal at the exterior of sleeve shaft 31 and seal 94 on turbine output shaft 88 provides a seal at the interior of sleeve shaft 31. Any leakage through splines 95 between sleeve shaft 31 and torque converter housing wall 97 and bearing 115 will flow to the chamber in the torque converter rotary housing. The line 77 has a further portion 96 extending from transfer passage 83 radially and axially in the output shaft to the front end of the output shaft. This construction of the line 77 provides a central internal torque converter supply line located largely inboard of the main transmission housing.

The outboard mounted rotary torque converter housing 93 has a rear clutch wall portion 97 connected by splines 95 to and driven by the front outboard end of sleeve shaft 31 and a front and outer wall portion 98 secured by screws 99 to the rear wall to form and enclose an annular operating chamber. The outboard cover housing 12 has at the open end an attaching flange 101 secured by screws 102 to the outer side of the main housing at the end wall 27. Cover housing 12 encloses the rotary torque converter housing and has a front transverse end wall 103. A ground member 104 having a shaft portion 106 extending toward but spaced from output shaft 88 and attaching flange 107 which is piloted in recess 108 in end wall 103 and secured by screws not shown. The bladed impeller member I is formed on the inside of rotary housing wall 98. The bladed turbine member T is secured to turbine hub 114 splined to output shaft 88 to transmit drive and not thrust. The output shaft is rotatably mounted in the input sleeve shaft of this same side input output torque converter. Bearing 115 between rotary housing rear wall 97 and turbine hub 114 supports the turbine, hub and output shaft for rotation relative to rotary housing 93. The bladed stator S is mounted by a one-way brake hub 109 splined on ground member shaft portion 106. The impeller, turbine and stator conventionally define a toric operating chamber. The one-way brake hub has an outer race 110 secured to the bladed stator S and an inner race 111 fixed by splines to ground sleeve 106 with rollers 112 therebetween. One race has conventional cams cooperating with the rollers to prevent reverse rotation and permit forward rotation. A thrust member 113 is fixed to the outer race and has a portion having opposite thrust faces between the turbine hub 114 and inner race 111. The thrust member 113 face contacting the turbine hub thrust face has radial grooves so there is a flow passage between the turbine and stator hubs. The rotary housing front wall 98 is rotatably supported and axially located by bearing 116 fixed to shaft portion 106. A bearing support member 117 is secured by screws and a fastener ring to the inner edge of front wall 98 and has a forwardly extending sleeve seal portion 118 extending into axial annular sealing flange 119 on the ground member 104. There is a ring seal ring between flange 119 and sleeve portion 118 to provide a torque converter chamber exit flow passage through bearing 116 and between the exterior of ground member shaft portion 106 and the interior of sleeve portion 118 and flange 119 to exit line 121 through flange 107 and front wall 103 to pipe fitting 122 providing an internal central exit passage. From the fitting a pipe 123 continues the outlet exit passage to cooler 124. The cooler outlet is returned by pipe 126 to the sump 57. The seal sleeve portion 118, flange 119 and ground member shaft portion provide a transfer passage to transfer fluid from the rotary torque converter housing 93 operating chamber to the stationary ground member flange 107 and cover housing wall 98. The passage 127 in wall 103 and ground sleeve shaft portion 106 provdies an alternate torque converter entrance passage which would be supplied from torque converter supply line 77 in wall 27 by a pipe passage 77 externally of the transmission housing and the above described internal torque converter supply passage with transfer passage 83 would be omitted. Also if the torque converter requires that the supply be connected to the impeller inlet then an external torque converter supply pipe continuation of line 77 is connected to exit passage 121 and the alternate entrance passage 127 is connected by an external pipe to the cooler and the internal supply passage 77 is omitted.

The lockup clutch 131 has a piston 132 in cylinder 133 formed in the rear wall 97. The driven plate 134 is fixed to turbine hub 114. The backing plate 136 is fixed to rotary housing 93.

The gearing 137, not shown in detail, is conventional preferably planetary power shift gearing, providing one or more forward drive ratios and a reverse drive from turbine output shaft 88 to load or final output shaft 138. A conventional fluid control system 139 is supplied by mainline branch 141 and preferably automatically provides in response to speed lockup clutch apply pressure to line 92 to apply lockup clutch 131 and manual forward and reverse control and automatic forward ratio control. The turbine output shaft is supported at the converter end by bearing 115 and at the end driving the gearing 137 by bearing 140 in wall 33.

When the engine drives the transmission input hub member 24, the bevel gear set 24-36 drives input sleeve shaft 31 and pump 51. The pump supplies fluid from sump 57 at a pressure limited by converter bypass valve 81 through central internal supply line 77 which is provided by a channel in passage plate 49, transfer passage 84 through the sleeve shaft 31 and passage 96 in the turbine output shaft 88 to the space between the adjacent ends of turbine output shaft 88 and ground member sleeve 106. The sleeve shaft 31 through spline 95 drives rotary housing 93 and impeller I to circulate fluid in a toroidal flow path (arrow) in the toric chamber formed by the bladed impeller I, turbine T and stator S members and the turbine drives output shaft 88 rotatably mounted in the input shaft of this same side input output torque converter. The supply pressure and toric flow induces inlet flow from the space between the ground sleeve 106 and turbine outlet shaft 88 through the entrance passage or space grooves in thrust member 113 between the stator hub 109 and turbine hub 114 into the toric flow path through the bladed stator S. The fluid exits from the toric flow path through the central internal exit passage between the stator hub 109 and rotary housing impeller front wall 98 and through the exit passage having portions extending through bearing 116 the space between the exterior of ground sleeve 106 and the interior seal member sleeve 118 and flange 119, passage 121 to fitting 122 and then by external passage 123 to cooler 124 and passage 126 to the internal sump 57. When the torque converter is filled and operating the entire operating chamber in the rotary housing is filled and the pressure is equalized in the toric flow chamber portion and between the turbine member and rear wall as there is fluid communication across the outer diameter of the turbine T and through the driven plate 134. The thrust of left-hand spiral bevel gear set 24–36 on the gear axis is when the driven gear is rotating clockwise as viewed from the rear or the output end is from the gear toward apex 41 and thrust bearing 38 provides the reaction thrust. The torque converter thrust is transferred to the rotary housing 93 and grounded in both directions by thrust bearing 116 axially fixed by a shoulder and snap ring to the axially fixed ground sleeve 106. Turbine member T thrust toward rear wall 97 is transferred by turbine hub 114 and thrust bearing 115 to the rear wall 97. All rearward thrust on rear wall 97 is transferred by the rotary housing 93 to thrust bearing 116. The splines 95 between the rotary housing rear wall 97 and sleeve shaft 31 permit sufficient relative axial movement so that no significant thrust is transmitted between these members. Forward rearwall 97 thrust may be and forward turbine thrust is transmitted to thrust member 113. Forward stator thrust is also transmitted to thrust member 113 so forward turbine and stator thrust are grounded through the inner race 111 and snap ring to the ground sleeve 106. Rearward stator thrust is transferred by thrust member 113 to turbine hub 114, bearing 115 and rotary housing 93.

The modified transmission shown in FIG. 3 has many portions identical and similar to FIG. 2 so like reference numerals primed have been used to identify these portions and reference is made to the above description for a description of these portions. The following description points out the identical, similar and different portions of the FIG. 3 transmission. The same fluid supply system for the torque converter as shown in FIG. 1 and described above is used. The housings are the same except for the outlet passage 121' in cover housing 12' which is described below. The input member 23' bevel gearset 24'-36', sleeve shaft 31', and the bearings mounting the input member and sleeve shaft in the housing are basically the same except that the left-hand spiral bevel gearset 24'-36' is designed, has spiral and pitch angles and tooth design to provide, when rotating clockwise as viewed from the output (arrow R), a gear thrust (arrow GT) toward the apex 41' and toward the converter to balance the net converter housing 93 thrust (arrow CT) in the opposite direction. The blade angles of the bladed members, the volume and velocity of toric flow and the operating characteristics, the speed of the members, torque and torque multiplication determine the rotary housing thrust.

The rotary torque converter housing 93' is at wall 98' rotatably mounted by a plane bearing 116' or needle bearing and seal (not shown) which permits free axial movement and thus does not transmit axial thrust to ground sleeve 106'. The rotary housing 93' at wall 97' is rotatably connected by splines 95' to sleeve shaft 31' and has a spline sleeve end abutting a shoulder 143 to transmit the large torque converter rotary housing thrust (arrow CT) directly to the sleeve shaft 31'. The lower rotary housing thrust which occurs during overrun is in the opposite direction and is transferred from wall 97' through bearing 115', turbine hub 114', thrust member 113' and inner race 111' to ground sleeve 106'. Some overrun thrust in the opposite direction (arrow CT) may also be transferred from wall 97' through snap ring 142 to sleeve shaft 31' to limit transfer of such thrust through the above path to the ground sleeve.

The end wall assembly consisting of housing end wall 27', support member 43', channel passage plate 49', pump housing 47' and pummp 51' is identical but the suction of support member 43' is different and shows some other passage portions such as suction passage 59 and a passage to the filter. The above described passages in FIG. 1 are structurally located in both passsage plate 49' and support member 43'.

The rotary housing 93' with regard to the converter structure and lockup clutch 131' are the same except that as above described bearing 116' is a plane bearing and bearing support 117' does not have sleeve 118 to provide a transfer passsage.

The ground sleeve 106' has an internal exit passage 144 connecting exit passage 121' to radial passage 146 for communication with the exit space between stator hub 109' and wall 98'. The closure or wall 147 in the sleeve shaft blocks direct communication of the exit passage with the inlet passage at the space between the turbine output shaft 88' and ground sleeve 106'.

The operation of the modified transmission shown in FIG. 3, is similar but has important differences now pointed out. Fluid is similarly supplied by the internal passages to the toric flow path but exits through the exit space between the stator hub 109' and the wall 98' and bearing support member 117' to exit passages, the radial passages 146, axial passage 144 in the ground sleeve to cover passage 121' and pipe 123' to cooler 124' and then is returned to sump 57'.

While the above described, particularly with respect to FIG. 2 but also in FIG. 3, internal torque converter supply passages are preferred, the supply passage 77 may be connected externally of cover housing 12' to its end wall 103'and continue as a pipe extending through passages 121', 144 and wall 147 and externally sealed to each wall where it passes through each wall to supply the entrance space between the ground sleeve 106' and sleeve and inner shafts 31', 88'.

The torque converter and the bevel gearset are designed to provide substantially equal and opposite axial thrust during maximum torque and power drive operation to substantially reduce or eliminate high thrust loads on the main thrust bearing 29'.

FIG. 4 is a partial view of the driven bevel gear 36' showing the lefthand spherical bevel gear looking at the near side of the gear as viewed in FIG. 3 showing the left-hand spherical bevel gear teeth center line to illustrate these terms and show the driving force, arrow D, from the driving gear which is the same as the direction of rotation, arrow R, of the driven gear and the resultant gear thrust, arrow GT.

It is claimed:

1. In a transmission; a housing having a main housing portion and a torque converter housing portion having a support wall spaced from said main housing; a sleeve shaft rotatably supported in said main housing portion and extending into said torque converter housing portion; an inner shaft rotatably supported in said sleeve shaft and extending into said torque converter portion; a ground member having a ground shaft nonrotatably mounted on said support wall and extending toward said sleeve and inner shafts; a rotary torque converter housing enclosing an annular chamber having axially spaced side walls with one side wall having bearing means rotatably mounted on said ground shaft and the other side wall having drive connecting means drive connected to said sleeve shaft; a hub member positioned adjacent said other side wall and drive connected to said inner shaft; torque converter means including a bladed impeller member, a bladed turbine member and a bladed stator arranged to provide a toric chamber and during rotation of the bladed impeller member circulating fluid in a toroidal flow path through the bladed turbine member and bladed stator to provide a torque multiplication drive to the bladed turbine member; one bladed member is drive connected to said hub; the other bladed member is drive connected to said rotary housing; said bladed stator is mounted on said ground shaft to prevent reverse rotation; entrance passage means to said toric chamber on one side of said stator between said stator and adjacent member; exit passage means from said toric chamber on the other side of said stator between said stator and adjacent member; a sump in said housing; source means providing regulated fluid pressure from said sump; supply passage means having transfer passage means including a shaft and connecting said source means to said entrance passage and outlet passage means having transfer passage means including a shaft and connecting said exit passage through said transfer passage means to said sump.

2. The invention defined in claim 1 and said supply passage means extending from said housing and said transfer passage means extending radially through said sleeve shaft and axially through said inner shaft to said entrance passage means.

3. The invention defined in claim 1 and said outlet passage means extending through said ground shaft.

4. The invention defined in claim 1 and said outlet passage means having transfer passage means extending from said exit passage means radially into and axially through said ground shaft to said housing.

5. The invention defined in claim 1 and said outlet passage means having transfer passage means having relatively rotating portions fixed to said ground member and rotary housing surrounding said ground shaft to provide a transfer passage between said portions and said ground shaft extending from said exit passage means in said rotary housing to said cover housing portion.

6. The invention defined in claim 1 and said supply passage means including a passage extending through said wall to said sleeve shaft, a radial passage through said sleeve shaft, seals on each side of the external surface of said sleeve shaft and said wall, an aligned radial and axial passage in said inner shaft extending to the entrance space between said inner shaft and ground shaft and to said entrance passage and said exit passage means extending through said ground member and said cover housing.

7. The invention defined in claim 1 and one of said bearing means rotatably mounting one side wall on said ground shaft and said drive connecting means drive connecting said other side wall to said sleeve shaft transmitting axial drive thrust without relative axial movement during drive operation and the other permitting substantially free relative axial movement.

8. The invention defined in claim 1 and said bearing means rotatably mounting one side wall on said ground shaft being thrust bearing means transmitting axial thrust without relative axial movement during operation and said drive connecting means drive connecting said other side wall to said sleeve shaft and permitting substantially free relative axial movement.

9. The invention defined in claim 1 and said bearing means rotatably mounting one side wall on said ground shaft being plane bearing means permitting free relative axial movement and said drive connecting means drive connecting said other side wall to said sleeve shaft having thrust means transmitting axial drive thrust without relative axial movement during drive operation.

10. The invention defined in claim 1 and said rotary torque converter housing providing converter drive thrust in one direction during drive operation; means connecting said rotary torque converter housing to said sleeve shaft to transmit said drive thrust to said sleeve shaft and drive gear means including another shaft and a gear set between said another shaft and said sleeve shaft providing gear drive thrust substantially equal and opposite to said converter drive thrust to substantially balance drive thrust on said sleeve shaft.

11. In a transmission; a housing having a main housing portion having a support wall with a central opening and a torque converter housing portion having an end wall spaced from said main housing; a thrust bearing on said support wall, a sleeve shaft rotatably supported on said thrust bearing in said main housing portion and extending into said torque converter housing portion; an inner shaft rotatably supported in said sleeve shaft and extending into said torque converter portion; a ground member having a ground shaft nonrotatably mounted on said end wall and extending toward said sleeve and inner shafts; a rotary torque converter housing enclosing an annular chamber having axially spaced side walls with one side wall having bearing means rotatably mounted on said ground shaft and the other side wall having drive connecting means drive connected to said sleeve shaft; a hub member positioned adjacent said other side wall and drive connected to said inner shaft; torque converter means including a bladed impeller fixed on said one side wall, a bladed turbine member fixed on said hub and a bladed stator mounted on said ground shaft to prevent reverse rotation and arranged to provide a toric chamber and during rotation of the bladed impeller member circulating fluid in a toroidal flow path through the bladed turbine member and bladed stator to provide a torque multiplication drive to the bladed turbine member; first passage means to said toric chamber on one side of said stator between said stator and hub for said turbine; second passage means from said toric chamber on the other side of said stator between said stator and one side wall having said impeller; a sump in said housing; source means providing regulated fluid pressure from said sump; supply passage means having transfer passage means including a shaft and connecting said source means to one of said passage means and outlet passage means having transfer passage means including a shaft and connecting the other of said passage means through said transfer passage means to said sump.

12. The invention defined in claim 11 and said first passage means being an entrance passage; said supply passage means being connected to said entrance passage means and said transfer passage means having a radial passage portion at the central opening of said support wall; a radial passage portion extending through said sleeve shaft, a radial passage portion in said inner shaft, first seal means between the outer surface of said sleeve shaft and the inner surface of said support wall on each side of said radial passage portions in said support wall and in said sleeve shaft, second seal means between the inner surface of said sleeve shaft and the outer surface of said inner shaft on each side of the radial passage portions in said sleeve shaft and inner shaft, and an axial passage portion connecting said radial passage portion in said inner shaft to said entrance passage; a cooler and said outlet passage means connecting said exit passage means through said transfer means including said ground shaft extending through said end wall to said cooler and from said cooler to said sump.

13. The invention defined in claim 12 and one of said bearing means rotatably mounting one side wall on said ground shaft and said drive connecting means drive connecting said other side wall to said sleeve shaft transmitting axial drive thrust without relative axial moement during drive operation and the other permitting substantially free relative axial movement.

14. The invention defined in claim 12 and said bearing means rotatably mounting one side wall on said ground shaft being thrust bearing means transmitting axial thrust without relative axial movement during operation and said drive connecting means drive connecting said other side wall to said sleeve shaft and permitting substantially free relative axial movement.

15. The invention defined in claim 12 and said bearing means rotatably mounting one side wall on said ground shaft being plane bearing means permitting free relative axial movement and said drive connecting means drive connecting said other side wall to said sleeve shaft having thrust means transmitting axial drive thrust without relative axial movement during drive operation.

16. The invention defined in claim 15 and said rotary torque converter housing providing converter drive thrust in one direction during drive operation from said rotary torque converter housing to said sleeve shaft through said drive thrust means to said sleeve shaft and drive gear means including an input drive member and a spherical bevel gear set with the driving gear on said input drive member and the driven gear on said sleeve shaft with the apex between said driven gear and said rotary housing having the driving direction and spherical angle providing gear drive thrust on the driven bevel gear on said sleeve shaft substantially equal and in a direction from said driven gear to said rotary housing and opposite to said converter drive thrust direction to substantially balance drive thrust on said sleeve shaft.

17. In a transmission; a main housing having a transverse wall at one end of said housing and having a central aperture; a sleeve shaft extending through said aperture in said wall and having rotary and axial thrust bearing means rotatably supporting and axially locating said sleeve shaft on said wall; a cover housing secured to said main housing providing a torque converter housing chamber between said cover housing and end wall and having a fixed ground member extending into said torque converter housing chamber toward said end wall; a torque converter housing having one side wall rotatably mounted on said ground member and another side wall drive connected to said portion of said sleeve shaft to rotate with said sleeve shaft in said torque converter housing chamber and enclosing between said side walls a torque converter operating chamber; and output shaft rotatably mounted in said sleeve shaft having a turbine hub drive connected to said output shaft and located in said torque converter operating chamber adjacent said other side wall; rotary bearing means mounting said turbine hub on said torque converter housing and torque converter means in said operating chamber including bladed pump means rotatably driven by said torque converter housing, bladed turbine means rotatably driving said turbine hub and bladed stator means mounted on said ground member to prevent reverse rotation operative when the pump means is driven to circulate fluid through the turbine means and stator means in a toroidal flow path providing a torque multiplication drive, a sump in said main housing; a torque converter supply passage; control valve means controlling the pressure in said supply passage; said supply passage having a portion in said end wall, transfer means extending through said sleeve shaft, through said output shaft and through the space between said turbine hub and stator hub to said toric flow path and exit passage means having a portion extending between said one side wall and said stator hub, a portion in said cover housing and including transfer means providing a passage between said portions.

18. In a transmission; a main housing having a transverse end wall at one end of said housing and another transverse wall spaced from said end wall; each wall having a central aperture; a sleeve shaft located between said walls and having a portion extending through said aperture in said end wall and having rotary and axial thrust bearing means rotatably supporting and axially locating said sleeve shaft on said walls; an input member having bearing means rotatably supporting said input member in said main housing transverse to said sleeve shaft; bevel gear means including a bevel gear on said sleeve shaft between said walls and a bevel gear on said input member; a cover housing secured to said main housing providing a torque converter housing chamber between said cover housing and end wall and having a fixed ground member extending into said torque converter housing chamber toward said end wall; a torque converter housing having one side wall rotatably mounted on said ground member and another side wall drive connected to said portion of said sleeve shaft to rotate with said sleeve shaft in said torque converter housing chamber and enclosing between said side walls a torque converter operating chamber; an output shaft rotatably mounted in said sleeve shaft having a turbine hub drive connected to said output shaft and located in said torque converter operating chamber adjacent said other side wall; rotary bearing means mounting said turbine hub on said torque converter housing; torque converter means in said operating chamber including bladed pump means rotatably driven by said torque converter housing, bladed turbine means rotatably driving said turbine hub and bladed stator means mounted on said ground member to prevent reverse rotation operative when the pump means is driven to circulate fluid through the turbine means and stator means in a toroidal flow path providing a torque multiplication drive; a sump in said main housing; a torque converter supply passage; control valve means controlling the pressure in said supply passage; said supply passage having a portion in said end wall, transfer means extending through said sleeve shaft, through said output shaft and through the space between said turbine hub and stator hub to said toric flow path and exit passage means having a portion extending between said one side wall and said stator hub, a portion in said cover housing and including transfer means providing a passage between said portions.

19. In a transmission; a main housing having a transverse end wall at one end of said housing and aother transverse wall spaced from said end wall; each wall having a central aperture; a sleeve shaft located between said walls and having a portion extending through said aperture in said end wall and having rotary and axial thrust bearing means rotatably supporting and axially locating said sleeve shaft on said walls; an input member having bearing means rotatably supporting said input member in said main housing transverse to said sleeve shaft; bevel gear means including bevel gear on said sleeve shaft between said walls and a bevel gear on said input member having the apex on the side adjacent said end wall and bevel gear axial thrust on said sleeve shaft is in one direction from said other wall toward said end wall; a cover housing secured to said main housing providing a torque converter housing chamber between said cover housing and wall and having a fixed ground member extending into said torque converter housing chamber toward said end wall; a torque converter housing having one side wall rotatably mounted on said ground member and another side wall axially fixed and drive connected to said portion of said sleeve shaft to rotate with said sleeve shaft in said torque converter housing chamber and enclosing between said side walls a torque converter operating chamber; an output shaft rotatably mounted in said sleeve shaft having a turbine hub drive connected to said output shaft and located in said torque converter operating chamber adjacent said other side wall; rotary bearing means mounting said turbine hub on said torque converter housing and torque converter means in said operating chamber including bladed pump means rotatably driven by said torque converter housing, bladed turbine means rotatably driving said turbine hub and bladed stator means mounted on said ground member to prevent reverse rotation operative when the pump means is driven to circulate fluid through the turbine means and stator means in a toroidal flow path providing a torque multiplication drive and a net torque converter axial thrust on said torque converter housing providing a torque converter thrust acting on said sleeve shaft in a direction opposite to said bevel gear thrust to balance a substantial portion of said bevel gear thrust.

* * * * *

UNITED STATES PATENT AND TRADEMARK OFFICE
CERTIFICATE OF CORRECTION

PATENT NO. : 3,953,970
DATED : May 4, 1976
INVENTOR(S) : Reece R. Fuehrer, James F. Hartz It is certified that error appears in the above-identified patent and that said Letters Patent are hereby corrected as shown below:

Title page, column 2, line 21 after "provided" insert --by--.

Column 1, line 12, after "through" insert --the input shaft and both through--, line 17, after "passage", insert --a comma (,)--, line 19, after "exit" insert --in--, line 20, after "passage" insert --a comma (,)--.

Column 3, line 2, change "58" to --57--, line 13, change "among" to --along--.

Column 9, line 32 (claim 13), change "moement" to --movement--.

Column 12, line 3 (claim 19 cont'd), before "wall" insert --end--.

Signed and Sealed this

Twenty-first Day of June 1977

[SEAL]

Attest:

RUTH C. MASON
Attesting Officer

C. MARSHALL DANN
Commissioner of Patents and Trademarks